United States Patent [19]

Steiner

[11] 4,234,481
[45] Nov. 18, 1980

[54] YELLOW PYRAZOLONE ESTER DYES FOR HEAT TRANSFER PRINTING

[75] Inventor: Russell I. Steiner, Reading, Pa.

[73] Assignee: Crompton & Knowles Corporation, New York, N.Y.

[21] Appl. No.: 847,892

[22] Filed: Nov. 30, 1977

[51] Int. Cl.$^3$ .................. C09B 29/22; C09B 29/36; C09B 29/50
[52] U.S. Cl. .................. 260/163; 8/467; 8/668; 106/20; 106/22; 428/195
[58] Field of Search .................. 260/163

[56] References Cited

U.S. PATENT DOCUMENTS

| | | | |
|---|---|---|---|
| 1,809,030 | 6/1931 | Geller | 260/163 |
| 2,439,798 | 4/1948 | Dickey et al. | 260/163 |
| 3,019,217 | 1/1962 | Joyce | 260/163 |

FOREIGN PATENT DOCUMENTS

| | | | |
|---|---|---|---|
| 2347124 | 3/1974 | Fed. Rep. of Germany | 260/163 |
| 305009 | 4/1955 | Switzerland | 260/163 |
| 386590 | 4/1965 | Switzerland | 260/163 |
| 763555 | 12/1956 | United Kingdom | 260/163 |

Primary Examiner—Helen M. S. Sneed
Attorney, Agent, or Firm—William H. Elliott, Jr.

[57] ABSTRACT

The application is concerned with new pyrazolone compounds having the structure:

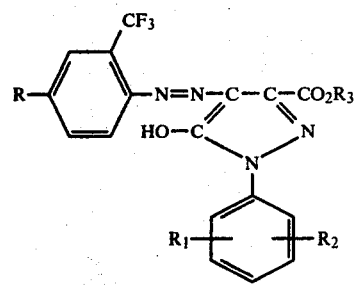

wherein R is hydrogen or halogen (especially fluorine, bromine and chlorine) and $R_1$ and $R_2$ independently of one another are hydrogen or halogen (especially bromine and chlorine) and $R_3$ is lower alkyl (especially methyl, ethyl, propyl and butyl). The compounds are useful in heat transfer printing of polyester fabrics and impart yellow shades thereto. The application discloses a method of making the new compounds and discusses the utilization of the compounds in the heat transfer printing of polyester fabrics, in the preparation of ink formulations, and in making transfer sheets for heat transfer printing.

9 Claims, No Drawings

YELLOW PYRAZOLONE ESTER DYES FOR HEAT TRANSFER PRINTING

This invention relates to new yellow pyrazolone compounds that are useful in heat transfer printing of polyester fabrics, to a method of making the new pyrazolone compounds, to transfer sheets carrying such compounds and adapted for use in heat transfer printing of polyester fabrics, to inks that are useful in making such transfer sheets, to an improved process using said compound and said transfer sheets, to an improved process using said compound and said transfer sheets for the heat transfer printing of polyester fabrics and to the printed or dyed fabrics produced thereby.

The new yellow azo-pyrazolone compounds of this invention have the following structure (hereinafter Structure I):

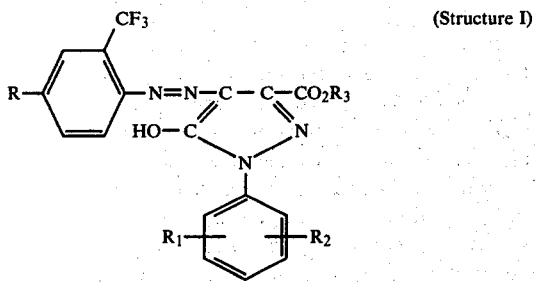

(Structure I)

wherein R is hydrogen or halogen (especially fluorine, bromine and chlorine) and $R_1$ and $R_2$ independently of one another are hydrogen or halogen (especially bromine and chlorine) and $R_3$ is lower alkyl (especially methyl, ethyl, propyl and butyl).

The azo-pyrazolone compounds of this invention are made by diazotizing 2-aminobenzotrifluoride or a 2-amino-5-halobenzotrifluoride and coupling the diazonium salt to a pyrazolone having the structural formula:

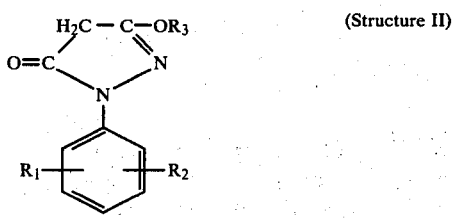

(Structure II)

wherein $R_1$ and $R_2$ independently of one another are hydrogen or halogen, and $R_3$ is lower alkyl.

For reasons of economy I prefer to use 2-aminobenzotrifluoride or 2-amino-5-chlorobenzotrifluoride as the diazo component; the analogous—5-fluoro and -5-bromo derivatives are more expensive but can be used for purposes of this invention.

The couplers that are suitable for use in accordance with this invention include:

1-phenyl-3-carbethoxy-5-pyrazolone;
1-(2-chlorophenyl)-3-carbethoxy-5-pyrazolone;
1-(3-chlorophenyl)-3-carbethoxy-5-pyrazolone;
1-(4-chlorophenyl)-3-carbethoxy-5-pyrazolone;
1-(2,5-dichlorophenyl)-3-carbethoxy-5-pyrazolone and
1-(3,4-dichlorophenyl)-3-carbethoxy-5-pyrazolone.

In lieu of the specific 3-carbethoxy compounds identified above, the analogous lower carbalkoxy derivatives of these compounds such as methyl, propyl and butyl can also be employed for purposes of this invention. Similarly in lieu of the specific chlorophenyl compounds identified above, the analogous halo derivatives such as bromo derivatives may also be used for purposes of this invention.

The new compounds prepared in accordance with the invention have a unique combination of properties and dyeing characteristics when used in the heat transfer printing of polyester fabrics. They impart clear bright yellow colors having good wet fastness and outstanding light fastness properties. They are especially suitable for use in the heat transfer printing applications where a rather high degree of fiber penetration is needed as for example in printing flat goods in solid colors and in printing pile fabrics. In such uses relatively little color is lost by "blow through" hence they are efficient from a color utilization standpoint. The Structure I compounds of this invention are also characterized by their unique strength build-up characteristics (especially so of the compounds where R is chlorine); although they develop somewhat weak tinctorial strength at pastel depths, they build up in strength quite rapidly as the applied concentration is increased. Transfer prints show good strength at mid-depths and superior strength at masstones. They are therefore ideally suited for transfer printing in those areas of application requiring deep intense shades.

Various techniques (such as melt transfer and wet transfer) have heretofore been used to produce transfer prints but they have not been widely utilized in commercial fabric printing operations. In the late 1950's the French firm, Filatures Prouvost Masurel et Cie, pioneered the development of a dry transfer printing process, referred to variously as the vapor-phase process, the dry heat process or the sublimation process; the use of this process is in a stage of continuing rapid growth and it is described in great detail in published literature and patents—e.g. British Specification No. 1,189,026 discloses an early embodiment of the process.

In this application the terms "thermal transfer process" and "heat transfer process" will be used interchangeably, but shall only refer to the sublimation or vapor-phase process of printing or dyeing synthetic textiles wherein the textiles are colored with water-soluble dyestuffs that undergo sublimation at temperatures below that at which the physical integrity of the textile is impaired. The dyeing or printing is carried out by printing a substrate (usually paper or a sheet of non-textile material) in an all-over or discontinuous pattern with an ink that contains the sublimable dyestuff. The printed substrate and the textile to be dyed or printed are brought into contact under controlled conditions of time, temperature and pressure whereby the dye on the substrate is caused to sublime or be vaporized onto the surface of the textile to penetrate into the fibers and to be entrained therein. Thereafter, the substrate and the dyed or printed textile are separated.

Also, as used herein the following terms shall be deemed to have the following meanings:

(a) "Heat transfer prints" shall be construed as referring to dyeings or pattern effects produced by the heat transfer process.

(b) "Pattern effects" shall be construed as referring to continuous (allover) effects as well as discontinuous (localized) effects.

(c) "Textile" shall be construed as referring to fabric (in web form or as piece goods), to non-woven materials and to finished articles made from such products.

(d) "Polyester" shall be construed as referring to textiles made entirely or predominantly of polyester fibers.

(e) "Transfer sheet" shall be construed as referring to a non-textile substrate (normally, but not necessarily, paper) in sheet, roll or web form having a pattern effect printed thereon with a dried film of an ink formulation adapted for use in the heat transfer printing of synthetic textiles.

(f) "Compatible dyestuffs" and "compatible sublimable dyestuffs" shall be construed as meaning water insoluble disperse dyes or pigments or fluorescent brightners that have essentially the same sublimability and thermal transfer characteristics, desirably they should be of about the same energy level and transfer at about the same rate under the same operating conditions.

No single sublimable disperse dyestuff or color of any hue possesses the combination of color characteristics, working properties and performance properties such that is has universal utility and can be effectively used in all types of thermal transfer printing applications. In selecting a dye or color for a particular end use application, in addition to the need for good fastness properties, the strength and hue developed on the particular fiber undergoing the printing or dyeing operation are highly significant from the standpoint of commercial acceptability; if the dyestuff will not develop the particular hue and depth of color desired by the designer or stylist, the dyestuff simply will not sell even though it may have outstanding fastness properties. The rate and extent to which the sublimed dyestuff will penetrate the fabric is another factor that determines whether and how a particular dyestuff can be utilized in a given type of heat transfer printing application. Thus where the sublimed dye penetrates deeply and rapidly into the fibers the dye cannot be used to produce sharp discontinuous or localized effects because feathering occurs at the edges of the localized pattern; such dyes however, if otherwise suitable, can be used to make heat transfer prints in solid colors on flat goods and on pile fabrics. On the other hand sublimed dyes that are merely deposited on the surface and do not penetrate deeply into the fibers are unsuitable for use in the heat transfer of pile fabrics since only the tip-ends of the fiber will be colored and "tipping" will result; and also for transfer printing of flat goods because "grin through" (whitening or color change that becomes visible as the fabric weave is stretched or distorted) will result in what is regarded by designers as an aesthetically objectionable fabric. Unfortunately, many of the sublimable dyestuffs that penetrate deeply and rapidly also have a tendency to "blow" through the fabric and considerable quantities of the dye are not retained by the fabric thus making for inefficient color utilization.

Thus, a good degree of penetration of the sublimed dyestuff is an important factor and desirable capability in the heat transfer printing of pile fabrics if tipping is to be avoided. Good penetration is also important in the heat transfer printing of solid colors on woven fabrics where the design or end use considerations call for minimizing the color contrast between the printed face of the fabric and the back thereof or to reduce "grin through" on flat goods generally.

Moreover, as is the case in all commercial dyeing the fastness properties to light and wet treatments is highly important.

My copending application Ser. No. 807,116 filed June 16, 1977 is directed to the use of a pyrazalone dye (a compound previously known from Swiss Patent No. 386,590 to dye polyester from aqueous dispersion) of the structure

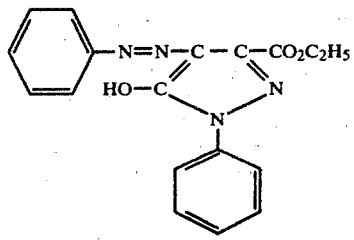

(Structure III)

to impart yellow color to polyester nylon and acrylic fabric by the heat transfer process. The Structure III compounds can be used to make localized pattern effects or transfer prints having outstanding light fastness and very good wet fastness properties but they cannot be efficiently used on pile fabrics since their low order of penetration causes tipping and when applied to flat goods in a solid or all-over pattern their relatively poor penetration results in a print in which the "grin through" effect is aesthetically objectionable.

My copending application Ser. No. 821,730 filed Aug. 4, 1977 is directed to the use of a new group of compounds having the structure:

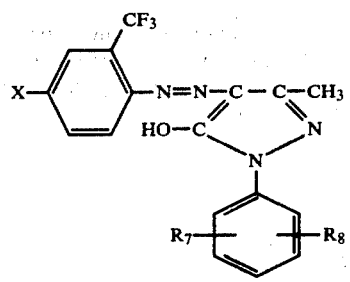

(Structure IV)

(wherein X represents halogen and $R_7$ and $R_8$ independently of one another are hydrogen, alkyl or halogen) to impart yellow colors to polyester and other synthetic fibers by the heat transfer process. The Structure IV compounds can be used to make transfer prints of good tinctorial strength that have outstanding light-fastness and very good wet fastness. The compounds deeply penetrate the fabric and therefore the compounds can ideally be used for heat transfer printing of pile fabrics and grin-through is greatly reduced on solid tone flat goods prints. Because they penetrate to a somewhat greater degree than the Structure I compounds of this application, there is a tendency for the dye to "blow through" with some attendant color loss during the printing operation.

In German OLS No. 1, 771,812 it has been suggested to use a dye known as C.I. Solvent Yellow 16 to impart yellow color to polyester fabrics by the heat transfer process. Solvent Yellow 16 has the structure:

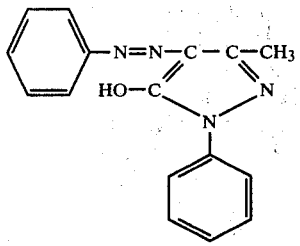
(Structure V)

However, the dyeings made therewith on polyester fabrics exhibit rather poor light fastness in that thermal transfer prints at a 4% depth breakdown quickly in the Fade-O-Meter showing a rating of 4–5 at 20 hours, 3 at 40 hours and 2 at 60 hours. In addition, Solvent Yellow 16 is of low tinctorial strength and although it exhibits a high degree of penetration into polyester, from a total color utilization standpoint, it cannot be efficiently used for making solid color heat transfer prints because a considerable portion of the color "blows" through the fabric in the heat transfer operation. In transfer printing multiply sandwich of polyester fabrics; considerable color will be found on the face of the 3rd ply and even the back of the 3rd ply is slightly stained.

Accordingly, it is an object of this invention to provide a new group of sublimable azo pyrazolone compounds or dyestuffs that can be used to impart yellow tones of superior wet and light fastness and with good penetration to polyester fibers by the thermal transfer printing process.

It is a further object of this invention to provide a process for making the new compounds.

It is another object of the present invention to provide an improved thermal transfer printing process for economically and efficiently using the new compounds to impart deep intense yellow hues of outstanding lightfastness and good color penetration to polyester fabrics.

It is another object of this invention to provide improved thermal transfer sheets incorporating said new dyestuffs for use in the aforesaid improved thermal transfer process.

It is a still further object of this invention to provide yellow heat transfer dyed or printed polyester textiles having outstanding lightfast properties and good penetration.

Other objects and advantages of the invention will be apparent from the description and the appended examples.

These objects and advantages are obtained in accordance with this invention by the aforementioned Structure I compounds and the use thereof as sublimable dyestuffs in the heat transfer printing of polyester fabrics.

The Structure I compounds are water-insoluble, and sublime and transfer readily at medium low energy levels. They exhibit good color strength when applied in medium depth and uniquely build-up to show superior color strength at heavy depths. They penetrate rather deeply into polyester fabrics at the thermal transfer operating conditions comparable to that provided by 30-second contact at 400° F. Moreover, this penetration is obtained in an efficient manner since relatively small amounts of color "blow" through the fabric. The resulting prints exhibit very good wet fastness properties and superior lightfastness.

The Structure I dyes are particularly suitable for use in mixtures with other compatible sublimable dyestuffs—of which many are presently commercially available—to provide compound color blends for producing a desired deep penetrating compound color in solid or all over patterns.

The following examples will serve to illustrate the preparation and use of the compounds of this invention. In these examples, unless otherwise indicated, parts are by weight, temperatures are given in degrees Centigrade and percentages are by weight.

EXAMPLE I

A diazonium salt solution was made by adding 31 g. of ice to a mixture of 46.9 g. (39.6 ml) of 32% HCl and 30 ml glacial HAc and dissolving 16.1 g. orthoaminobenzotrifluoride in the iced mixture; thereafter 25 ml 4N NaNO$_2$ solution was added while holding the temperature below 0° C. and the diazonium salt solution was stirred for 45 minutes after the last addition of sodium nitrite before coupling with the pyrazolone prepared as follows: 40 grams Na$_2$CO$_3$ was dissolved in 200 ml water, and 23.2 g. of 1-(phenyl-3-carbethoxy-5-pyrazolone was added. The mass was heated to 50° C. to dissolve the pyrazolone, filtered to clarify, cooled to 0° C. by addition of ice, and the diazonium salt solution at 0°–5° C. was added thereto and held at pH 9.0–9.2 by addition of Na$_2$CO$_3$.

The resulting compound was isolated by filtering, washed with water till free of alkali (as tested with Brilliant Yellow indicator paper), dried and recovered 32.5 g. of water insoluble yellow powder having the structural formula:

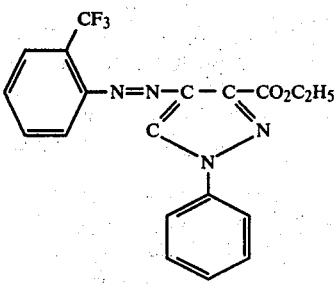
(STRUCTURE VI)

In use in the thermal transfer process, the new yellow pyrazolone dye is dispersed in an ink base formulation including a vehicle (of either the aqueous or solvent type) and a film-forming binder adapted to the type of printing operation to be used in printing the transfer sheet—i.e. gravure, flexographic, lithographic offset or rotary screen—and printed on the substrate—usually a paper sheet or web. The problems incident to paper selection and to the manufacture and formulation of ink bases (including the selection of appropriate vehicles, solvents, binders, thinners, etc. used to make the ink base) that are suitable for use in the printing of the heat transfer substrates by the various printing techniques are all well understood in the art and no special or unique problems arise by virtue of the use of the specified pyrazolone dyes in such formulations.

The dyes in the ink formulation used in producing the substrate should preferably be free of dispersants and ground to a particle size that can be readily dispersed in the vehicle—preferably less than 3 microns in size. When used in ink systems with other compatible sublimable dyes or optical brighteners, they, too, should preferably be dispersant free and have the same order of particle size as the specified pyrazolone dye component.

EXAMPLE 2

A mixture of 200 g. (108 ml) of 93% $H_2SO_4$ and 100.2 g. (54 ml) of 40% nitrosyl sulfuric acid solution was cooled to 25°–30° C. and thereafter 58.6 g. (0.3 gram mols) 2-amino-5-chlorobenzotrifluoride was fed dropwise thereto. Upon completion of diazotization the diazonium solution was coupled to 1-phenyl-3-carbethoxy-5-pyrazolone as described in Example 1. This gave a yellow compound having properties similar to that of Example 1 and having the structure:

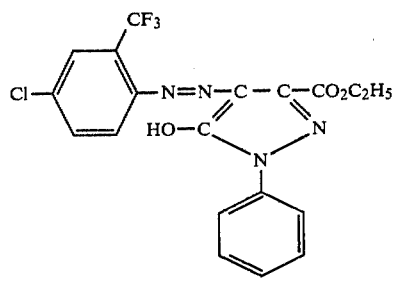

(STRUCTURE VII)

Examples 3 to 4 below illustrate various aspects of the invention, namely: (a) an ink formulation (a solvent type vehicle—for gravure printing); (b) the transfer sheet and (c) the improved heat transfer process.

EXAMPLE 3

(a) A gravure ink with a viscosity of 22 seconds on a #2 Zahn cup, was made by blending 20 parts of the yellow compound of Example 1 with 80 parts of an ink base (composed of 8 parts ethyl cellulose as the binder and 72 parts of a vehicle (80% by weight ethanol and 20% by weight toluol) and grinding the ingredients in a shot mill to a particle size under 3 microns.

(b) To make the transfer sheet, the resulting ink was diluted to give a 4% dye concentration and printed on a standard gravure base paper stock using a Geiger laboratory gravure proofing press with an engraved cylinder at 150 cells/linear inch. The printed transfer sheet was allowed to dry.

(c) An undyed piece of 100% texturized polyester fabric was placed on the printed face of the dried transfer sheet. The composite was positioned between two platens with the unprinted side of the transfer sheet in contact with the heated surface of the platen and was under conventional heat transfer operating pressure and heated for 30 seconds at 205° C. Thereafter the fabric and used transfer sheet were separated. The polyester fabric was dyed on its face in a hue of good tinctorial strength and excellent fastness properties and the color penetrated the fabric so that the back was colored in a yellow hue of about ¼ the depth of color on the face thereby minimizing the contrast between the printed face and the back of the fabric.

All fastness tests were conducted in accordance with AATCC Standard Test Methods as follows:

Light Fastness—Xenon-AATCC Test Method 16E-1971 and Fade-O-Meter—AATCC Test Method 16A-1971.

Wash Fastness—Test #2A—AATCC Test Method 61-1972.

Sublimation Test—AATCC Test Method 117-1973.

Perspiration—Test specimens were evaluated for resistance to acids by AATCC Test Method 15-1973.

Crocking—AATCC Test Method 8-1972.

Ozone fading—AATCC Test Method 109-1975.

The results are tabulated in Table 1 below. The table gives numerical values to the tests described above, using the usual AATCC numerical ratings running from 5 to 1; in which 5 represents no or negligible change, 4 represents a slight change, 3 represents a noticeable change and 1 represents much change.

EXAMPLE 4

Example 3 was repeated using the yellow compound of Example 2 instead of the Compound of Example 1. The results are tabulated in Table 1, below:

TABLE 1

| | Example 3 | | Example 4 | |
|---|---|---|---|---|
| Light | | | | |
| Fade-O-Meter | (4–5 at 60 hours) | | 5 at 60 hours | |
| | #2A Wash | Perspiration Acid | #2A Wash | Perspiration Acid |
| Alteration | 4–5 | 5 | 5 | 5 |
| Staining | | | | |
| Acetate | 5 | 5 | 5 | 5 |
| Cotton | 5 | 5 | 5 | 5 |
| Nylon | 5 | 5 | 5 | 5 |
| Polyester | 5 | 5 | 5 | 5 |
| Wool | 5 | 5 | 5 | 5 |
| Orlon | 5 | 5 | 5 | 5 |
| Crock Test | | | | |
| Wet | 5 | | 5 | |
| Dry | 5 | | 5 | |
| Sublimation | | | | |
| 340°/30″ | 4–5 | | 4–5 | |
| 385°/15″ | 4 | | 4 | |
| Gas fade-2 cycles | 5 | | 5 | |
| Ozone fade-2 cycles | 5 | | 5 | |

I claim:

1. A compound of the formula

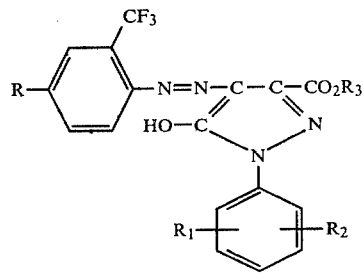

where R is hydrogen or halogen, and $R_1$ and $R_2$ independently of one another are hydrogen, or halogen, and $R_3$ is lower alkyl.

2. A compound according to claim 1 wherein R, $R_1$, and $R_2$ are hydrogen, and $R_3$ is ethyl.

3. A compound according to claim 1 wherein R is chlorine, $R_1$ and $R_2$ are hydrogen, and $R_3$ is ethyl.

4. A compound according to claim 1 where R is chlorine, $R_1$ is hydrogen, $R_2$ is chlorine positioned ortho to the nitrogen and $R_3$ is ethyl.

5. A compound according to claim 1 wherein R, is chlorine, $R_1$ is hydrogen, $R_2$ is chlorine positioned para to the nitrogen and $R_3$ is ethyl.

6. A compound according to claim 1 wherein R, $R_1$ and $R_2$ are chlorine and $R_3$ is ethyl.

7. The method of making a compound according to claim 1 comprising diazotizing 2-amino-5-halobenzotrifluoride, coupling the diazonium salt to a pyrazolone of the formula:

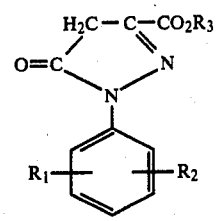

wherein $R_1$ and $R_2$ independently of one another are hydrogen or halogen, and $R_3$ is lower alkyl.

8. A compound according to any of claims 1, 2 or 3 wherein the dye is ground to particle size less than 3 micron.

9. A compound according to any of claims 4, 5 or 6 wherein the dye is ground to particle size less than 3 micron.

* * * * *